United States Patent [19]

Kistner

[11] Patent Number: 4,587,169

[45] Date of Patent: May 6, 1986

[54] ABRASION RESISTANT COATINGS

[75] Inventor: John F. Kistner, Oakdale, Minn.

[73] Assignee: Minnesota Mining and Manufacturing Company, St.Paul, Minn.

[21] Appl. No.: 641,723

[22] Filed: Aug. 17, 1984

[51] Int. Cl.$^4$ ............................................. B32B 27/38
[52] U.S. Cl. .................................... 428/413; 428/447; 427/386; 528/31; 528/32; 528/10
[58] Field of Search ..................... 428/44, 7, 413, 332, 428/203; 427/386; 528/32, 31, 10

[56] References Cited

U.S. PATENT DOCUMENTS 4,293,606 10/1981 Zollinger et al. .................. 428/203
4,333,998 6/1982 Leszyk ................................. 430/12

Primary Examiner—Edith Buffalow
Attorney, Agent, or Firm—Donald M. Sell; James A. Smith; Mark A. Litman

[57] ABSTRACT

Abrasion resistant films formed by the copolymerization of epoxy-terminated silanes and an aliphatic monoepoxy resin display reduced odor and increased water-repellency.

12 Claims, No Drawings

ABRASION RESISTANT COATINGS

BACKGROUND OF THE INVENTION

There are many different factors which can limit the durability of articles besides normal wear during use. Color fading, surface abrasion, and soiling, for example, can sufficiently diminish the aesthetics of an article so that it ought to be replaced. Some items such as photographs and works of art cannot be replaced when such damage has been wrought on them. In the past, clear films of synthetic polymers containing epoxy-terminated silanes have been used to protect certain items, including color photographs, against degradation.

U.S. Pat. No. 4,049,861 discloses abrasion resistant coatings based upon the polymerization of epoxy-terminated silanes. A high degree of abrasion resistance is provided by that technology in combination with polyepoxide resins.

U.S. Pat. No. 4,156,046 discloses an abrasion resistant, bloom resistant coating for use on substrates which are susceptible to damage from ultraviolet radiation, abrasion, and/or soiling. The abrasion resistant ultraviolet radiation protective coatings of U.S. Pat. No. 4,156,046 are highly effective, but tend to be subject to surface crazing when contacted with water. It is surprising that such water sensitivity exists in a coating that is resistant even to very strong solvents, and it would be desirable to eliminate the water-sensitivity. U.S. Pat. No. 4,293,606 discloses low friction, abrasion resistant coatings for transparent film, particularly motion picture film. Siloxyl containing carbinols and fine particles are used to reduce the frictional properties of the coatings. A wide range of aliphatic and aromatic epoxy comonomers are disclosed as copolymerizable with the epoxy-silane main component.

U.S. patent application Ser. No. 496,572, filed on May 20, 1983, discloses the use of 15 to 30% by weight of limonene monoxide with at least 60% by weight of epoxy-terminated silane to produce a transparent abrasion resistant coating with reduced water sensitivity. Limonene monoxide has a strong offensive odor which requires significant ventilation in the workplace.

These patents generally teach the use of polyepoxy and aromatic epoxy comonomers which have been found to generate highly unfavorable odors in the workplace. U.S. Pat. No. 4,293,606 generally includes aliphatic epoxy resin comonomers in its disclosure but does not differentiate amongst them for their properties.

SUMMARY OF THE INVENTION

Abrasion resistant coatings comprising the cured product of more than sixty percent by weight of epoxy-terminated silane, 5 to 20% by weight of an aliphatic monoepoxide having from 8 to 20 carbon atoms, and less than 10% by weight of other copolymerizable epoxide materials display excellent abrasion resistance and resistance to water marking. The use of 2 to 20% by weight of ultraviolet radiation (UV) absorbers also provides protection against ultraviolet radiation fading without crystallization of the UV absorbers.

DETAILED DESCRIPTION OF THE INVENTION

Epoxy-Terminated Silanes

Epoxy-terminated silanes are compounds or materials having polymerizable (preferably terminal) epoxy groups and polymerizable silane groups, the bridging of these groups being through a non-hydrolyzable aliphatic, aromatic, or mixed aliphatic-aromatic divalent hydrocarbon radical which may have N and/or O atoms in the radical chain. It is preferred to have no N atoms and most preferred to have O atoms present only adjacent to the epoxy group. The O atoms, for example, would be within the chain only as ether linkages. These radical chains may be generally substituted as is well known in the art, as substituents on the chain do not greatly affect the functional ability of the epoxy-terminated silanes to undergo the essential reactions necessary for polymerization through the siloxane or epoxy terminal groups. Examples of substituents which may be present on the linkage or bridging moieties are groups such as $NO_2$, alkyl (e.g., $CH_3(CH_2)_nCH_2$), alkoxy (e.g., methoxy), halogen, etc. In structural formulae appearing within this description of the invention, such allowable substitution of the bridging moieties is included unless specifically excluded by language such as "unsubstituted divalent hydrocarbon radical."

Examples of preferred epoxy-terminated silanes useful in the practice of this invention are compounds of the general formulae:

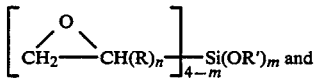 and

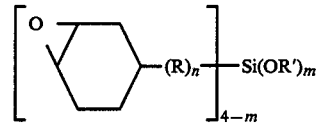

where R is a non-hyrolyzable divalent hydrocarbon radical (aliphatic, aromatic, or mixed aliphatic-aromatic containing) of less than 20 carbon atoms or a divalent radical of less than 20 carbon atoms composed of C, N, S, and O atoms (these atoms are the only atoms which should appear in the backbone of the divalent radicals), any oxygen present being in the form of ether linkages. It is preferred to have no N atoms. No two heteroatoms may be adjacent within the backbone of the divalent hydrocarbon radicals. This description defines divalent hydrocarbon radicals for epoxy terminated siloxanes in the practice of this invention.

A more preferred formula definition of epoxy terminated silanes is

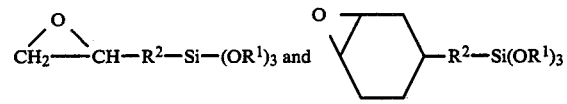

wherein $R^2$ is a non-hydrolyzable divalent hydrocarbon radical of fewer than 20 carbon atoms or a divalent group of fewer than 20 carbon atoms the backbone of which is composed of only C, N, S, and O atoms with no two adjacent heteroatoms, and $R^1$ is an aliphatic hydrocarbon group (e.g., alkyl) or acyl group of fewer than 10 carbon atoms.

The compositions employed in this invention can contain an epoxy silane of the above formula in which n is from 0 to 1, m is 1 to 3, R is any divalent hydrocarbon radical such as methylene, ethylene, decalene, phenylene, cyclohexylene, cyclopentylene, methylcyclohexylene, 2-ethylbutylene, and allene or an ether radical such as —CH₂—CH₂—O—CH₂—CH₂—, —(CH₂CH₂O)₂—CH₂—CH₂—, —O—CH₂—CH₂—, and —CH₂O—(CH₂)₃—, R' can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula (CH₂CH₂O)ₖZ in which k is an integer of at least 1, and Z is hydrogen.

The most preferred epoxy-terminated silanes are those represented by the formulae:

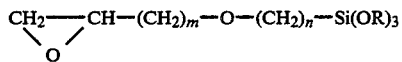

and

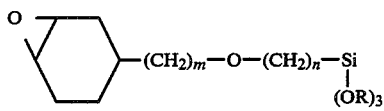

wherein R is an alkyl group of up to 6 carbon atoms, and m and n are independently 1 to 6.

The compositions may additionally contain addenda such as surface active agents, viscosity modifiers, spreading aids, dyestuffs, etc. These may be blended with other epoxy-terminated silanes and comonomers to adjust the physical properties of the final coating. Comonomers are those materials known in the art to be copolymerizable with epoxy groups or silane groups and include epoxies and silanes. Oligomeric, and polymeric, particulate-free friction reducing agents as taught in U.S. Pat. No. 4,293,606 are preferred. The friction reducing agents of U.S. Pat. No. 4,333,998 have also been found to be particularly useful. These materials and agents generally may constitute up to 5 or 10% by weight of the layer. The friction reducing agents are generally present as 0.05 to 1.5%, preferably less than 1%, by weight of the layer. By particulate-free in the present invention is meant any material that can pass through a 1 micron filter.

Catalysts

Catalysts in the present invention are generally used in amounts of from 0.01 to 10% by weight of the reactive ingredients in the curable composition. Preferably from 0.5 to 5% by weight is used, the amount varying with the particular catalyst used. One class of useful catalysts according to the present invention are highly fluorinated aliphatic sulfonylic catalysts and onium catalysts. The related highly fluorinated aliphatic sulfonic catalysts are very useful as are certain Lewis and Bronstad acids, but are less preferred. The sulfonic materials are defined as a highly fluorinated aliphatic sulfonic acid or salt thereof. Fluoroaliphatic sulfonic acids, methanes and imides and their preparation and use are disclosed in U.S. Pat. No. 4,049,861.

Onium catalysts are preferred in the practice of the present invention are aromatic, organic adducts of an aromatic organoatomic cation of a Group Va, VIa, or VIIa atom particularly phosphorous, antimony, sulfur, nitrogen, and iodine atoms, and an anion. Aromatic as used in the description of the groups on the onium catalysts as used in the present invention means an aromatic or heterocyclic ring (phenyl, naphthyl, substituted or unsubstitued 5, 6 or 7-membered heterocycle comprised of only C, N, S, O, and Se atoms with no more than one atom in the ring selected from S, O, or Se atoms) so attached to the nominative atom that it is at least as electron withdrawing as benzene. For example, phenacyl

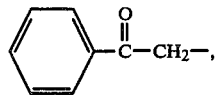

would be a useful aromatic group (being at least as electron withdrawing as benzene), but benzyl

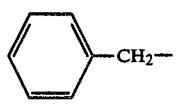

would not be as useful because of instability of the compound which would impair storate stability. Representative aromatic rings are phenyl, naphthyl, thienyl, pyranyl, furanyl and pyrazolyl, substituted or not.

A descriptive formula for the onium catalysts of the present invention would be

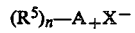

wherein
each $R^5$ is independently an aromatic group at least as electron withdrawing as benzene, and $R^5$ groups may be bonded together,
n is a positive whole integer equal to the valence of A plus one,
A is a group Va, VIa, or VIIa atoms, and
X is an anion.

These onium materials are already known in the art. For example, U.S. Pat. Nos. 4,058,400; 4,058,401; 4,135,255; 4,102,687 and 4,026,705 show the use of certain onium compounds as cationic polymerization catalysts for specific monomers.

The presence of catalytic amounts of moisture has been found to be necessary in the initiation of the condensation of silanes with those catalysts. Atmospheric moisture will usually be sufficient, but water may be added to the system if desired or if polymerization is needed in the absence of air for any particular application.

Examples of suitable onium salts include, but are not limited to:

Onium Salts Having a Period Group VIa Cation
    Triphenylsulfonium hexafluoroantimonate
    4-chlorophenyldiphenylsulfonium tetrafluoroborate
    Triphenyl teluronium pentachlorobismutate
    Triphenyl selenonium hexafluoroantimonate
    Diphenyl,p-thiophenyl phenyl sulfonium hexafluoroantimonate Onium Salts Having a Period Group VIIa Cation
    Diphenyliodonium hexafluoroantimonate
    4-Chlorophenylphenyliodonium hexafluorophosphate
    4-Trifluoromethylphenylphenyliodonium tetrafluoroborate
    4-methylphenylphenyliodonium tetrafluoroborate
    2,2'-Diphenyliodonium hexafluorophosphate The compositions of the invention can be prepared by mixing the onium salt with the epoxy-terminated silane composition until a solution is formed. Because many of the onium salts have limited solubility in the silicon-containing compound, it is often preferable to first dissolve the onium salt in a liquid diluent that is inert to the components of the composition and then mix this solution into the reactive composition.

The aromatic iodonium salts are of the formulae:

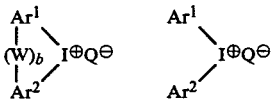

wherein $Ar^1$ and $Ar^2$ are aromatic groups having 4 to 20 carbon atoms and are selected from phenyl, naphthyl, thienyl, furanyl and pyrazolyl groups; W is selected from

where $R^{11}$ is aryl of 6 to 20 carbon atoms or acyl of 2 to 20 carbon atoms (such as phenyl, acyl, benzoyl, etc.); a carbon-to-carbon bond; or $R^{12}$—C—$R^{13}$, where $R^{12}$ and $R^{13}$ are selected from hydrogen, alkyl groups of 1 to 4 carbon atoms, and alkenyl groups of 2 to 4 carbon atoms; and b is zero or 1; and Q is a halogen-containing complex anion selected from tetrafluoroborate, hexafluorophosphate, hexafluoroarsenate, hexachloroantimonate and hexafluoroantimonate; a fluoroaliphatic sulfonic acid; a bis-(fluoroaliphaticsulfonyl)methane; or a bis(fluoroaliphaticsulfonyl)imide.

Preferred compounds from this group include those where n=0. Further preferred materials have $Ar^1$ and $Ar^2$ as a phenyl group.

The aromatic sulfonium salts are of the formulae:

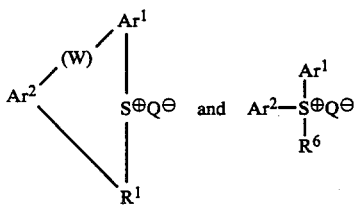

wherein $Ar^1$ and $Ar^2$ can be the same or different, selected from aromatic (as defined above for aromatic iodonium salts) and $R^6$, W and Q are the same as defined before. Preferred compounds of this class are those in which $Ar^2$ and $R^1$ are phenyl.

The aromatic onium salt photocatalysts useful in the photopolymerizable compositions of the invention are of themselves photosensitive only in the ultraviolet. They are latent catalysts which must be mixed with the reactants then activated by irradiation. They can be further sensitized to the near ultraviolet and the visible range of the spectrum by sensitizers for known photolyzable onium compounds in accordance with the teachings of U.S. Pat. No. 3,729,313.

Copolymerizable Aliphatic Epoxy Compound

Copolymerizable aliphatic epoxy compounds according to the present invention have the formula:

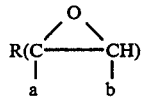

wherein R is a linear or branched (i.e., non-cyclic) aliphatic radical of 8 to 20 carbon atoms. Aliphatic includes hydrocarbons which also may have ether and ester oxygens and thio ether groups therein. Preferably a and b are H or, when fused together, the atoms necessary to form a 5- or 6-member cycloaliphatic ring. R is preferably selected so that the epoxy compound, upon homopolymerization provides a polymer having a glass transition temperature $(T_g)$ below $-25°$ C.

More preferred are straight chain saturated aliphatic α-epoxides such as 1,2-epoxydecane, 1,2-epoxyoctane, 1,2-epoxyundecane, 1,2-epoxydodecane, 1,2-epoxytetradecane, 1,2-epoxyhexadecane, 1,2-epoxyoctadecane, and 1,2-epoxydidecane. Also preferred are the alkanol glycidyl ethers (e.g., having molecular weights between 115 and 360) having 8 to 20 carbon atoms, such as octan-1-ol glycidyl ether, tetradecan-1-ol glycidyl ether, octadecan-1-ol glycidyl ether, etc.

Most preferred are aliphatic epoxides or mixtures of aliphatic monoepoxides having between 12 and 20 carbon atoms such as the α-monoepoxides obtained by the epoxidation of the corresponding mono-αolefins. An example of a commercially available mixture of such $C_{15}$ to $C_{18}$ α-monoepoxides is sold as "Vikolox 15-18" (Viking Chemical Co., Minneapolis, Minn.) The α-monoepoxide may be present as 5–20% by weight, preferably greater than 10% up to 20% by weight, and most preferably as 14 to 18% by weight of all reactive components and photoinitiator.

Siloxyl-Containing Polycarbinols

The coating also contains a sufficient amount of siloxyl-containing polycarbinols (preferably form 0.01 to 15% by weight, more preferably 0.05 to 10% by weight and most preferably 0.1 to 5% by weight) to provide the needed frictional properties. The preferred class of materials are oligomers and polymers as described in U.S. Pat. Nos. 4,130,708 and 4,333,998. The siloxy-containing polycarbinols, which can also be described as organofunctional silicones having carbinol functionality, are well known materials. Examples of commercially available materials of this class include Dow Corning 193 Surfactant, Dow Corning 1248 Fluid, Dow Corning XF4-3557 Fluid, Dow Corning Q4-3667 Fluid and Dow Corning Q2-8026 Fluid, all of which are available from Dow Corning Corporation, Midland Mich. These materials are polydimethylsiloxanes containing alcohol functional groups grafted onto the siloxane chain. Illustrative structural formulas of the siloxy-containing polycarbinols are as follows:

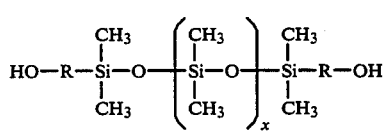

and

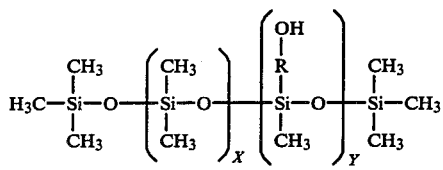

where R is a hydrocarbon radical, typically containing 1 to 10 carbon atoms, and X and Y are integers, typically having a value in the range of from 2 to about 100. The siloxy-containing polycarbinols are described in detail in U.S. Pat. No. 4,130,708, the disclosure of which is incorporated herein by reference.

The methyl group of that formula may be replaced by a phenyl group having no more than 10 carbon atoms, including substituted phenyl groups such as o-chlorophenyl, tolyl, p-ethylphenyl, m-cyanobutylphenyl, 3,4-dimethylphenyl, naphthyl, etc. The preferred substituents on such phenyl groups are meta and para substituents of Cl, Br and alkyl of 1 to 4 carbon atoms. The more preferred groups in the position of the methyl groups pendant from the silicon atoms are methyl, ethyl, propyl, butyl, phenyl and tolyl.

Ultraviolet Absorbers

Ultraviolet absorbers within the preferred practice of this invention fall into the following classes:

BENZOPHENONES: This class comprises substituted 2-hydroxybenzophenones. They are available with a variety of substituents on the basic molecule to provide proper compatibility, non-volatility, and particular absorption properties. Typical substituted 2-hydroxybenzophenones are 2-hydroxy-4-methoxy-benzophenone, 2-hydroxy-4-octyloxybenzophenone, 4-dodecycloxy-2-hydroxybenzophenone, and 2,2'-dihydroxy-4,4'-dimethoxybenzophenone. The art recognizes substituted 2-hydroxybenzophenones as a class.

BENZOTRIAZOLES: This class comprises derivatives of 2-(2'-hydroxyphenyl)benzotriazole. Typical examples are 2-(2'-hydroxy-5'-methylphenyl)benzotriazole and 2-(2'-hydroxy-5'-t-octylphenyl)benzotriazole. Substituted 2-(2'hydroxyphenyl)benzotriazoles are also an art recognized class of ultraviolet radiation absorbers.

SUBSTITUTED ACRYLATES: These are another art recognized class of UV absorbers. Typical examples are ethyl-2-cyano-3,3diphenyl acrylate, and p-methoxybenzylidene malonic acid dimethyl ester.

ARYL ESTERS: This art recognized class includes aryl salicylates, benzoates, and esters of resorcinol. Typical examples are phenyl salicylate, p-t-octylphenyl salicylate, resorcinol monobenzoate, and 2,4-di-t-butylphenyl-3,5-di-t-butyl-4hydroxybenzoate.

Combinations of these UV absorbers are often used to aggregate the properties of the individual absorbers. Preferred absorbers are (I) 2,4-dihydroxybenzophenone, (II) 2,2'4,4'-tetrahydroxybenzophenone, (III) 2-(2'-hydroxy-5methylphenyl)benzotriazole and (IV) 2-(3',5'-di-t-amyl-2'hydroxyphenyl)benzothiazole.

Some minor amounts of other copolymerizable epoxy resins or polyepoxy resins may be present, but they do not significantly improve properties of the composition of the invention. In fact, these non-preferred optional components must not be present in amounts that would provide an undesirable odor to the workplace. Characteristically, this requires less than 10% by weight of any other copolymerizable epoxy monomers preferably less than 5% copolymerizable epoxy monomers (other than the aliphatic α-monoepoxides requried in the present invention) and most preferably less than 1% (including 0%). Such other copolymerizable monomers that should not be present include aliphatic polyepoxy resins, cyclic (cycloaliphatic, aromatic, and heterocyclic) epoxy resins (both mono- and poly-epoxies).

The ultraviolet radiation absorbing materials are generally used in an amount between 2 and 20% by weight of the abrasion resistant layer. Preferably between 3 and 10% by weight is used, and more preferably between 4 and 8% by weight is used. The large amounts of absorbers capable of being dissolved in the layer are quite surprising, particularly in the absence of flexibilizing epoxies as described in U.S. Pat. No. 4,156,046.

Reference to the following examples will provide further understanding of the present invention.

EXAMPLE 1

A solution was prepared by mixing the following ingredients:

| | |
|---|---|
| (1) γ-glycidoxypropyltrimethoxysilane (Dow Corning Z-6040) | 73.8 g. |
| (2) Triphonylsulfonium hexafluoroantimonate 30% in γ-glycidoxypropyltrimethoxysilane | 4.2 g. |
| (3) "Vikolox 15-18" | 16.0 g. |
| (4) Oligomeric, inert fluorochemical surfactant coating aid (50% in Z-6040) | 0.35 g. |
| (5) Polydimethylsiloxane diol | 0.63 g. |
| (6) 2,4-Dihydroxybenzophenone | 5.0 g. |
| (7) Fragrance (Ungerer F and C) | 0.02 g. |

The solution was machine coated onto cleaned 3×5 inch color photographic prints using a wire-wound bar coating procedure to provide a 3 micron thick wet coating and then cured under ultraviolet light. The composition provided a clear, abrasion resistant coating that resisted water marking when wiped with water. The composition had no offensive odor before curing.

EXAMPLE 2

The composition and film coating produced in Example 1 was compared with an identically thick composition and film comprising the materials of Example 1A of U.S. Ser. No. 496,572, filed May 20, 1983. That composition contained 70% Z-6040, 20% limonene monoxide, 5% 2,4-dihydroxybenzophenone, 5% triphenylsulfonium hexafluoroantimonate, and 0.2% of the inert fluorocarbon coating aid. The properties of the compositions were essentially identical except that the aroma of the composition of Example 1 was mild and fresh while that of the prior art composition smelled strongly like turpentine. The composition of the present invention also displayed a slight improvement in glossiness and abrasion resistance.

I claim:

1. An abrasion-resistant, water-repellent film on a substrate, said film comprising the reaction product of a composition comprising:
    (1) more than 60% by weight of an epoxy-terminated silane,
    (2) 5 to 20% by weight of an aliphatic monoepoxide having between 8 and 20 carbon atoms in the aliphatic group, and (3) less than 10% by weight of a material copolymerizable with epoxy groups, other than the aliphatic monoepoxide.

2. The film of claim 1 wherein 2 to 20% by weight of an ultraviolet radiation absorber is present and the composition is particulate-free.

3. The film of claim 2 wherein said ultraviolet radiation absorber is selected from the group consisting of benzophenones and benzotriazoles.

4. The film of claim 1 further comprising from 0.01 to 15% by weight of a siloxyl containing polycarbinol.

5. The film of claim 1 wherein said epoxy-terminated silane has the formula

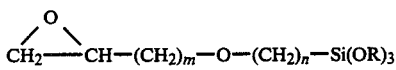

or

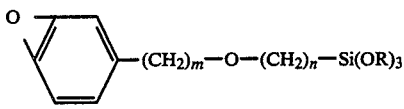

wherein R is an alkyl of 1 to 6 carbon atoms and m and n are independently 1 to 6.

6. The film of claim 2 wherein said epoxy-terminated silane has the formula

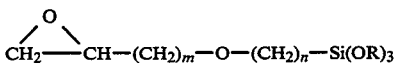

wherein R is an alkyl of 1 to 6 carbon atoms and m and n are independently 1 to 6.

7. The film of claim 4 wherein no materials copolymerizable with epoxy groups other than an aliphatic α-monoepoxide having from 12-20 carbon atoms in the aliphatic group and the epoxy-terminated silane are present in said film.

8. The film of claim 1 wherein no materials copolymerizable with epoxy groups other than an aliphatic α-monoepoxide having from 12-20 carbon atoms in the aliphatic group and the epoxy-terminated silane are present in said film.

9. A polymerizable liquid composition comprising at least 60% by weight of an epoxy-terminated silane, greater than 10% to 20% by weight of an aliphatic α-monoepoxide having 8 to 20 carbon atoms in the aliphatic group, less than 10% by weight of materials copolymerizable with epoxy groups other than the epoxy-terminated silane and the aliphatic epoxy resin, 1 to 10% by weight of a latent catalyst capable of curing both epoxy and silane groups, and 2 to 20% by weight of an ultraviolet radiation absorbing material.

10. A particulate-free polymerizable liquid composition consisting essentially of at least 60% by weight of an expoxy-terminated silane, greater than 10% to 20% by weight of an aliphatic α-monoepoxide having 8 to 20 carbon atoms in the aliphatic group, less than 10% by weight of materials copolymerizable with epoxy groups other than the epoxy-terminated silane and the aliphatic epoxy resin, 1 to 10% by weight of a latent catalyst capable of curing both epoxy and silane groups, and 2 to 20% by weight of an ultraviolet radiation absorbing material.

11. An abrasion-resistant, water-repellent film on a substrate, said film comprising the reaction product of a composition consisting essentially of
   (1) more than 60% by weight of an epoxy-terminated silane,
   (2) 5 to 20% by weight of an aliphatic monoepoxide having between 8 and 20 carbon atoms in the aliphatic group, and
   (3) less than 10% by weight of a material copolymerizable with epoxy groups, other than the aliphatic monoepoxide, said composition also containing as non-reactive components 3 to 10% by weight of ultraviolet radiation absorbers.

12. The film of claim 11 further comprising from 0.01 to 15% by weight of a siloxyl containing polycarbinol.

* * * * *